United States Patent [19]

Stafford et al.

[11] 4,442,679
[45] Apr. 17, 1984

[54] VERTICAL SHELL AND TUBE HEAT EXCHANGER WITH SLEEVES AROUND UPPER PART OF TUBES

[75] Inventors: Donald C. Stafford, Hinsdale; Tushar K. Shah, Cresthill; Vincent F. Allo, Warrenville, all of Ill.

[73] Assignee: Chicago Bridge & Iron Company, Oak Brook, Ill.

[21] Appl. No.: 479,666

[22] Filed: Mar. 28, 1983

[51] Int. Cl.³ .............................................. B01D 9/04
[52] U.S. Cl. ..................................... 62/123; 165/141; 165/142
[58] Field of Search .................. 62/123, 124, 534, 532, 62/67, 317; 165/141, 142

[56] References Cited

U.S. PATENT DOCUMENTS

| | | | |
|---|---|---|---|
| 2,718,279 | 9/1955 | Kraus | 62/532 |
| 3,085,626 | 4/1963 | Bognar et al. | 165/142 |
| 3,403,726 | 10/1968 | Jones et al. | 165/142 |
| 3,603,103 | 9/1971 | Sheffield | 62/124 |
| 3,924,675 | 12/1975 | Essebaggers | 165/142 |
| 4,286,436 | 9/1981 | Engdahl et al. | 62/123 |
| 4,296,612 | 10/1981 | Allo | 62/123 |
| 4,335,581 | 6/1982 | Nail | 62/123 |

Primary Examiner—Ronald C. Capossela
Attorney, Agent, or Firm—Merriam, Marshall & Bicknell

[57] ABSTRACT

A falling film freeze exchanger having a shell connected to vertically spaced apart horizontally arranged circular upper and lower tube sheets; a plurality of vertically positioned parallel tubes, with each tube extending through and connected to a hole in each tube sheet; an inlet to feed a liquefied refrigerant gas to the lower part of the shell side of the heat exchanger and an outlet to withdraw refrigerant vapor from the upper part of the shell side of the heat exchanger; a liquid distribution box positioned above the upper tube sheet and a conduit to deliver an aqueous feed liquid to the liquid distribution box; a solid walled sleeve, surrounding and spaced outwardly from each tube, joined to the upper tube sheet and extending downwardly a short distance below the refrigerant liquid/gas interface on the shell side thereby providing a refrigerant vapor space between each sleeve and tube; and a hole in and through the upper part of the sleeve wall near the upper tube sheet.

3 Claims, 2 Drawing Figures

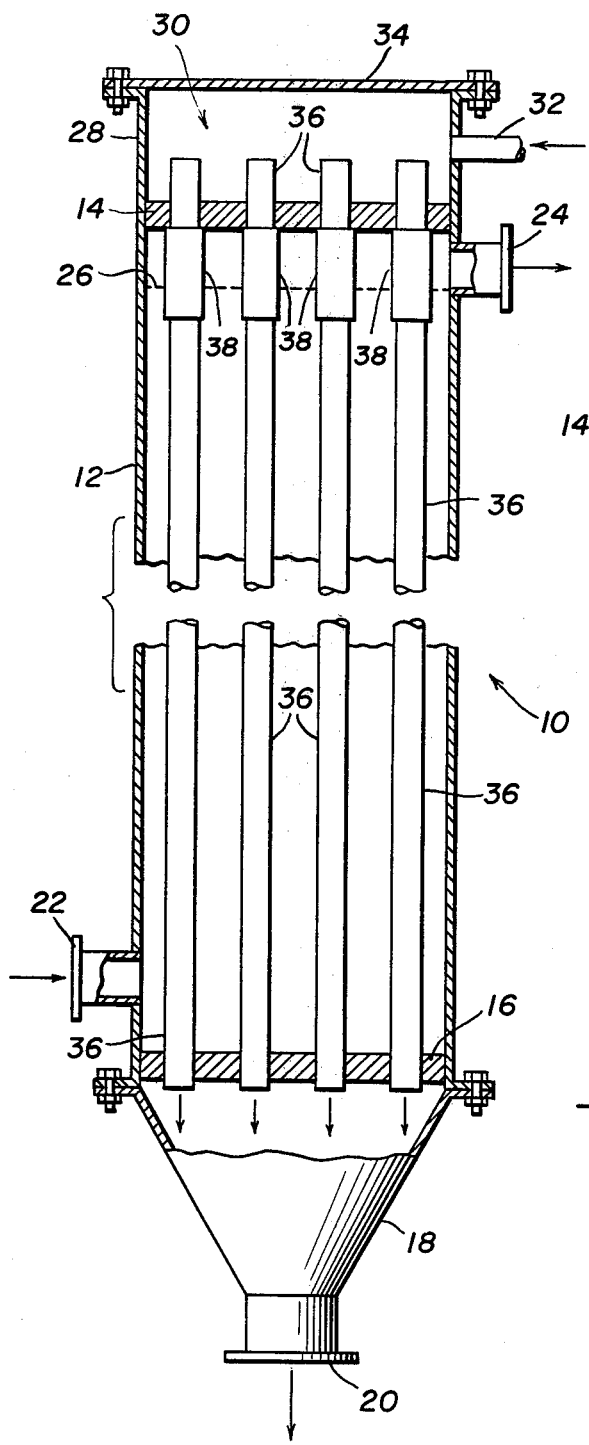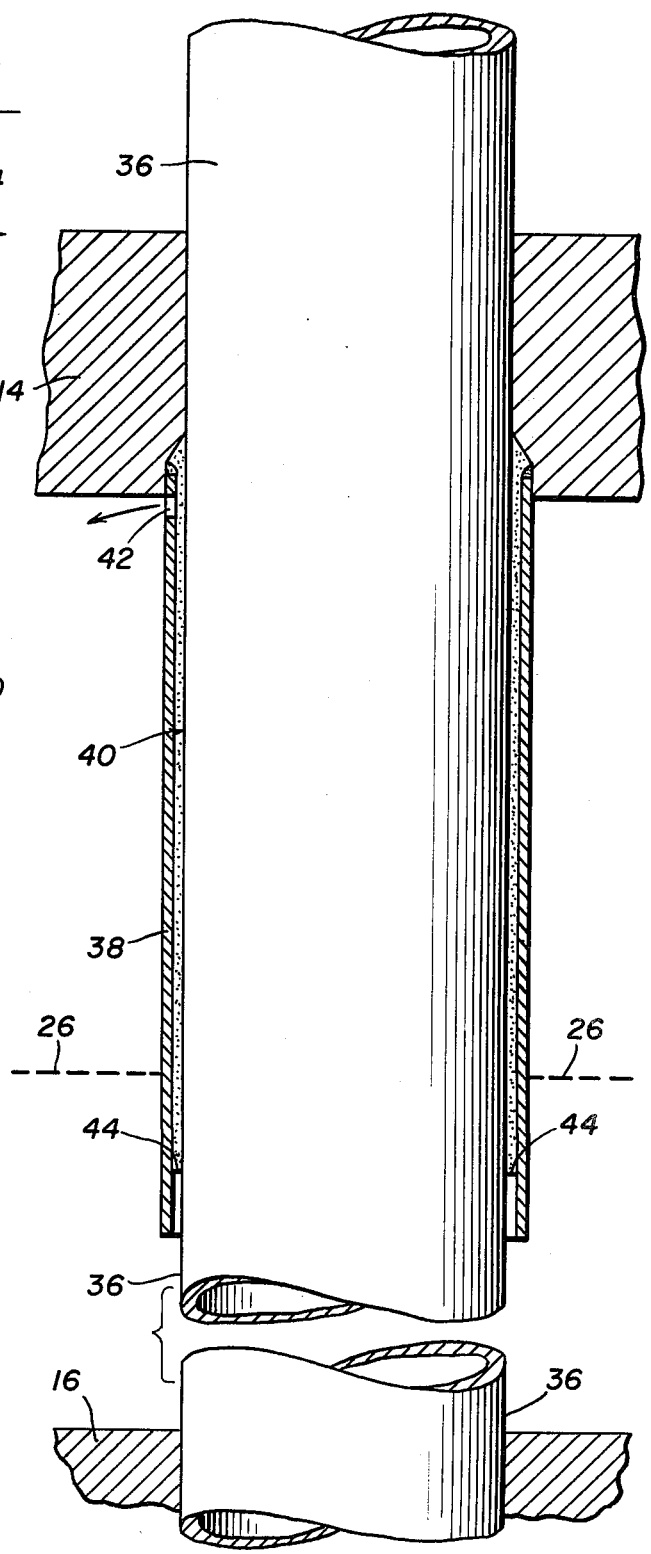

VERTICAL SHELL AND TUBE HEAT EXCHANGER WITH SLEEVES AROUND UPPER PART OF TUBES

This invention relates to shell and tube vertical freeze exchangers. More particularly, this invention is concerned with an improved freeze exchanger which has vertical tubes surrounded by external sleeves to form a vapor space therebetween so as to achieve a more uniform cold temperature over the length of the tubes.

BACKGROUND OF THE INVENTION

Shell and tube heat exchangers have an array of tubes extending between and through two spaced apart tube sheets surrounded by a shell. The shell is provided with an inlet and an outlet so that a suitable heat exchange liquid or gas can be circulated through the shell to cool or heat a liquid flowing through each tube.

Each end of the array of tubes can be left open, or exposed, for use in some processing operations. For other operations, one or both ends can be enclosed by a liquid retaining header, which may or may not have a removable cover or access port.

Although shell and tube heat exchangers are generally used to heat a liquid feed stream, they can be used for cooling such a stream. Shell and tube heat exchangers of the described types can be used as freeze exchangers for producing fresh water from brackish water and seawater, for concentrating fruit and vegetable juices, and industrial crystallization processes. As the liquid flows through each tube, it can be cooled enough to crystallize a solid from the liquid. Thus, by cooling seawater, ice is obtained which when separated, washed and melted provides potable water. When a fruit or vegetable juice is similarly chilled, ice forms and is removed to provide a concentrated juice.

Freeze exchangers of the described type can use any cooling fluid on the shell side to cool a liquid flowing downwardly through the tubes. The fluid can be fed through one end and removed through the other end of the freeze exchanger in a substantially unidirectional flow. Some suitable cooling fluids are refrigerant gases such as ammonia and Freon brand refrigerants.

When a refrigerant is used, it is generally liquefied first and then fed as a liquid to the shell side of the freeze exchanger through an inlet port in the lower part of the shell. A volume of refrigerant liquid is maintained on the shell side with a refrigerant vapor volume above the liquid level. The refrigerant liquid level is usually maintained about at the lower part of an outlet port in the shell below the upper tube sheet. Accordingly, essentially refrigerant vapor and little liquid is withdrawn from the outlet port.

Actual operating experience has shown that the area of the tubes adjoining the refrigerant liquid-vapor shell side interface is exceptionally cold, and colder than other surface areas along the tube length. As a result, when an aqueous liquid flows downwardly through each tube and is cooled, there is a strong propensity for ice to deposit and build up as a ring on the inside of the tube. The ice ring restricts flow through the tubes and sometimes totally blocks the tubes. The capacity of the freeze exchanger is drastically reduced when the tubes are restricted or blocked. To obtain normal capacity, the freeze exchanger must be taken out of service and the ice melted before it is replaced in service. This represents an operating loss. There is a need, accordingly, for a freeze exchanger which avoids or reduces the formation of ice in freeze exchanger tubes, especially ice deposits favored by having a shell side refrigerant liquid-vapor interface in direct contact with the tubes.

SUMMARY OF THE INVENTION

According to the invention there is provided a falling film freeze exchanger comprising a shell connected to vertically spaced apart horizontally arranged circular upper and lower tube sheets; a plurality of vertically positioned parallel tubes, with each tube extending through and connected to a hole in each tube sheet; means to feed a liquefied refrigerant gas to the lower part of the shell side of the heat exchanger and means to withdraw refrigerant vapor from the upper part of the shell side of the heat exchanger; a liquid distribution box positioned above the upper tube sheet and means to deliver an aqueous feed liquid to the liquid distribution box; a solid walled sleeve, surrounding and spaced outwardly from each tube, joined to the upper tube sheet and extending downwardly a short distance to terminate beneath the intended liquefied refrigerant level on the shell side thereby providing a refrigerant vapor space between each sleeve and tube; and, a hole in and through the upper part of the sleeve wall near the upper tube sheet.

The heat exchange through the sleeve is relatively poor. Even though heat exchange between the refrigerant vapor in the sleeve and the tube interior is good, the vapor prevents an excessively cold area from forming about at the liquefied refrigerant/vapor interface. This deters an ice ring from forming in the tube at that interface.

The means to withdraw refrigerant vapor from the upper part of the shell side of the heat exchanger can constitute an exit port opening positioned to be at least partially above the intended or operating level of liquefied refrigerant in the shell side of the freeze exchanger.

The hole in each sleeve desirably is sized to restrain exit of vapor from the space around the tube so that the vapor therein develops a pressure which forces the refrigerant liquid level in the space between the sleeve and tube to be close to the bottom of the sleeve.

BRIEF DESCRIPTION OF THE DRAWINGS

FIG. 1 is a partial elevational view, partially broken away and in section, of a freeze exchanger according to the invention; and FIG. 2 is an enlarged view, partially in section and broken away, of a freeze exchanger tube with a surrounding sleeve.

DETAILED DESCRIPTION OF THE DRAWINGS

To the extent it is reasonable and practical, the same numbers will be used to identify the same or similar elements or parts in the various views of the drawings.

With reference to FIG. 1, the freeze exchanger 10 has a vertical cylindrical circular metal shell 12 which is joined to upper tube sheet 14 and lower tube sheet 16. A conical end 18, connected to the lower end of shell 12, is provided with an exit port 20 through which liquid is removed from the tube side of the heat exchanger 10. A liquefied refrigerant gas is fed to the shell side of the freeze exchanger 10 through port 22. Refrigerant vapor is removed through upper port 24 which is located partially or wholly above the refrigerant liquid level 26. Extending upwardly from the edge of upper tube sheet 14 is a wall extension 28 of shell 12 which defines a distribution box surrounding space 30. Conduit 32 communicates with an opening in wall 28 and provides a means for delivering an aqueous feed liquid to space 30. Removable cover 34 is placed on top of wall 28.

Each one of a plurality of vertically positioned parallel circular tubes 36 extends through and is joined to vertically aligned holes in the upper tube sheet 14 and lower tube sheet 16. Feed liquid fed to space 30 flows downwardly through the tubes 36 into the space surrounded by conical end 18 and then out exit port 20.

As shown in FIGS. 1 and 2, a solid walled circular sleeve 38 surrounds each tube 36 in spaced apart axial arrangement so as to provide a vapor space 40 between each tube exterior surface and the sleeve interior surface. Each sleeve 38 is connected to the bottom part of upper tube sheet 14 by suitable means, such as welding when the elements are each metal. The sleeve extends downwardly a short distance and terminates beneath the level 26 of liquefied refrigerant in the shell side of the heat exchanger. A small hole 42 is positioned in and through the upper part of each sleeve wall. The hole 42 is desirably positioned close to, or adjacent, the bottom surface of upper tube sheet 14 so as to prevent stagnant warmer refrigerant vapor from accumulating in the uper part of the sleeve. By placing the hole at or near the top of the sleeve, upwardly flowing cold vapor will exist along essentially the entire length of the sleeve.

The size of the hole 42 in each sleeve is dimensioned so as to restrain escape of refrigerant vapor from space 40. As a result, the pressure of the vapor will force the refrigerant liquid level 44 in space 40 down to close to the bottom end of the sleeve 38 as shown in FIG. 2 while the refrigerant liquid level 26 remains as shown in FIG. 1. The presence of vapor in the space 40 for essentially the entire length of the sleeve prevents formation of areas on the inside of the tube which are sharply colder than other tube areas. This reduces or eliminates conditions which seem to favor deposition of ice on the tube interior wall or surface, such as when the refrigerant liquid-vapor interface directly contacts, and is located at, the upper portion of the tubes. The vapor in space 40 functions somewhat as an insulator and causes a more uniform but cold temperature to develop along the length of the tube. Since ice deposition is deterred or avoided, operation of the freeze exchanger is more trouble free since plugging of the tubes is minimized.

The foregoing detailed description has been given for clearness of understanding only, and no unnecessary limitations should be understood therefrom, as modifications will be obvious to those skilled in the art.

What is claimed is:

1. A freeze exchanger comprising:
  a shell connected to vertically spaced apart horizontally arranged circular upper and lower tube sheets;
  a plurality of vertically positioned parallel tubes, with each tube extending through and connected to a hole in each tube sheet;
  means to feed a liquefied refrigerant gas to the lower part of the shell side of the heat exchanger and means to withdraw refrigerant vapor from the upper part of the shell side of the heat exchanger;
  a liquid distribution box positioned above the upper tube sheet and means to deliver an aqueous feed liquid to the liquid distribution box;
  a solid walled sleeve, surrounding and spaced outwardly from each tube, joined to the upper tube sheet and extending downwardly a short distance to terminate beneath the intended liquefied refrigerant level on the shell side, thereby providing a refrigerant vapor space between each sleeve and tube; and
  a hole in and through the upper part of the sleeve wall near the upper tube sheet.

2. A freeze exchanger according to claim 1 in which the means to withdraw refrigerant vapor from the upper part of the shell side of the heat exchanger constitutes an exit port opening positioned to be at least partially above the intended level of liquefied refrigerant in the freeze exchanger.

3. A freeze exchanger according to claim 1 in which the hole in each sleeve is sized to restrain exit of vapor from the space around the tube so that the vapor therein develops a pressure which forces the liquefied refrigerant liquid level in the space between the sleeve and tube to be close to the bottom of the sleeve.

* * * * *